(12) United States Patent
Chandra et al.

(10) Patent No.: US 8,495,317 B2
(45) Date of Patent: Jul. 23, 2013

(54) SYSTEM AND METHOD FOR IMPROVING PERFORMANCE OF DATA CONTAINER BACKUPS

(75) Inventors: Anuj Chandra, Andhra Pradesh (IN); Ujjwal Daga, West Bengal (IN); Yellepragada Venkata Subrahmanya Sarma, Andhra Pradesh (IN); Siva Sai Prasad Palagummi, Andhra Pradesh (IN)

(73) Assignee: CA, Inc., Islandia, NY (US)

( * ) Notice: Subject to any disclaimer, the term of this patent is extended or adjusted under 35 U.S.C. 154(b) by 308 days.

(21) Appl. No.: 12/710,117

(22) Filed: Feb. 22, 2010

(65) Prior Publication Data

US 2011/0208928 A1 Aug. 25, 2011

(51) Int. Cl.
*G06F 12/00* (2006.01)
(52) U.S. Cl.
USPC .................. 711/162; 711/173; 718/1
(58) Field of Classification Search
USPC ....................... 711/162, 173; 718/1
See application file for complete search history.

(56) References Cited

U.S. PATENT DOCUMENTS

| 7,290,168 | B1* | 10/2007 | DeKoning | 714/5.11 |
|---|---|---|---|---|
| 7,441,141 | B2* | 10/2008 | Poustchi et al. | 714/4.11 |
| 2005/0138312 | A1* | 6/2005 | Kubo et al. | 711/162 |
| 2009/0164994 | A1* | 6/2009 | Vasilevsky et al. | 718/1 |
| 2010/0070725 | A1* | 3/2010 | Prahlad et al. | 711/162 |
| 2011/0066754 | A1* | 3/2011 | Stryker et al. | 709/241 |
| 2011/0202650 | A1* | 8/2011 | Abraham et al. | 709/224 |

* cited by examiner

*Primary Examiner* — Hashem Farrokh
(74) *Attorney, Agent, or Firm* — Baker Botts, LLP

(57) ABSTRACT

A method for improving performance of data container backups comprises identifying a data container on a source computer to be backed up. A snapshot image of the data container is generated, wherein the snapshot image comprises one or more partitions. Data is read simultaneously from each of the one or more partitions to a destination computer over one or more transport paths. Each of the one or more transport paths comprises one or more threads. The data read to the destination computer is backed up such that the data retains a physical block sequence of the data container.

20 Claims, 5 Drawing Sheets

SYSTEM AND METHOD FOR IMPROVING PERFORMANCE OF DATA CONTAINER BACKUPS

TECHNICAL FIELD

The present application generally relates to computer systems and networks, and more particularly to data containers.

BACKGROUND

With the rapid increase in information technology utilization, the requirement of storing large amounts of data has also increased. It is necessary in most business applications that the data be safeguarded from loss due to physical damage of storage devices, accidental deletion, or security compromises. Thus, backup systems are often used to maintain and preserve data in case of loss.

Data can be stored in a data container, a data structure or abstract data type whose instances are collections of other objects. Examples include, but are not limited to Virtual Machines and storage objects provided by cloud vendors such as Amazon S3™ or Windows Azure™ Blob Storage. Data containers can be very convenient, but they can present problems in backing up the data they contain. Although data containers are particularly useful for large-scale objects and collections of objects, the large amount of data may presents problem in performing backup operations.

SUMMARY OF EXAMPLE EMBODIMENTS

The present disclosure is directed to a system and method for improving the performance of data container backups. The teachings of the present disclosure may allow for increased efficiency in backing up large amounts of data stored in data containers such as virtual machines.

In accordance with a particular embodiment of the present disclosure, a method for improving performance of data container backups comprises identifying a data container on a source computer to be backed up. A snapshot image of the data container is generated, wherein the snapshot image comprises one or more partitions. Data is read simultaneously from each of the one or more partitions to a destination computer over one or more transport paths. Each of the one or more transport paths comprises one or more threads. The data read to the destination computer is backed up such that the data retains a physical block sequence of the data container.

In accordance with another aspect of the present invention, a system for improving performance of data container backups comprises a processor-controlled server. The server comprises a memory, a snapshot module, a reading module, and a backup module. The snapshot module is operable to identify a data container on a source computer to be backed up and generate a snapshot image of the data container, wherein the snapshot image comprises one or more partitions. The reading module is operable to read data simultaneously from each of the one or more partitions to a destination computer over one or more transport paths, wherein each of the one or more transport paths comprises one or more threads. The backup module is operable to back up the data read to the destination computer, such that the data retains a physical block sequence of the data container.

In accordance with another aspect of the present invention, logic is encoded in a tangible computer readable media. The logic is operable, when executed by a computer to identify a data container on a source computer to be backed up and generate a snapshot image of the data container, wherein the snapshot image comprises one or more partitions. The logic is further operable to read data simultaneously from each of the one or more partitions to a destination computer over one or more transport paths, wherein each of the one or more transport paths comprises one or more threads. The logic is further operable to back up the data read to the destination computer, such that the data retains a physical block sequence of the data container.

Technical advantages of particular embodiments of the present disclosure include method for improving performance of data container backups. For example, certain implementations may increase the overall backup throughput rate considerably, thereby reducing the time required to backup virtual machines. The embodiments of the claimed invention use the available resources optimally ensuring higher returns on investment in technology. In a similar way, the multiple datastore paths can also be used to restore virtual machine data faster.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Many current backup processes are carried out over networks. This is particularly true for backups of large commercial systems, including virtual machines and other data containers. For example, VMware® Consolidated Backup (VCB) enables backup of virtual machines running on a source computer (host computer) to a destination computer (backup proxy server). The backup process may involve creating snapshot images of the virtual machines and mounting the snapshot images on the destination computer. Thereafter, the backup is carried out at the destination computer, and the snapshot images may be un-mounted from the destination computer. In some cases, APIs provided by VMware® are used to read data from snapshot images, thereby eliminating the need to mount the snapshot images at the destination computer. In both scenarios, snapshot images are read serially from the destination computer to the source computer, and may result in long backup windows. This process is very time consuming, as well as highly wasteful of computer resources. Furthermore, network latency issues often cause the data read process to run slower than the backup process, requiring backup applications to wait for data reads to complete.

While backup systems are essential components of computer systems and networks, the teachings of the present disclosure may provide for a faster, more efficient backup of data containers over computer networks. In accordance with the teaching of the present disclosure, a system and method for improving performance of data container backups are disclosed. The following detailed description is made with reference to the figures. Exemplary embodiments are described to illustrate the subject matter of the disclosure, not to limit its scope.

In accordance with a particular embodiment of the present disclosure, a method for improving performance of data container backups comprises identifying a data container on a source computer to be backed up. A snapshot image of the data container is generated, wherein the snapshot image comprises one or more partitions. Data is read simultaneously from each of the one or more partitions to a destination computer over one or more transport paths. Each of the one or more transport paths comprises one or more threads. The data read to the destination computer is backed up such that the data retains a physical block sequence of the data container. Transport paths may include Ethernet connections and fibre channel Logical Unit Numbers (LUNs). Finally, the data read is backed up to the destination computer.

Figure 1:
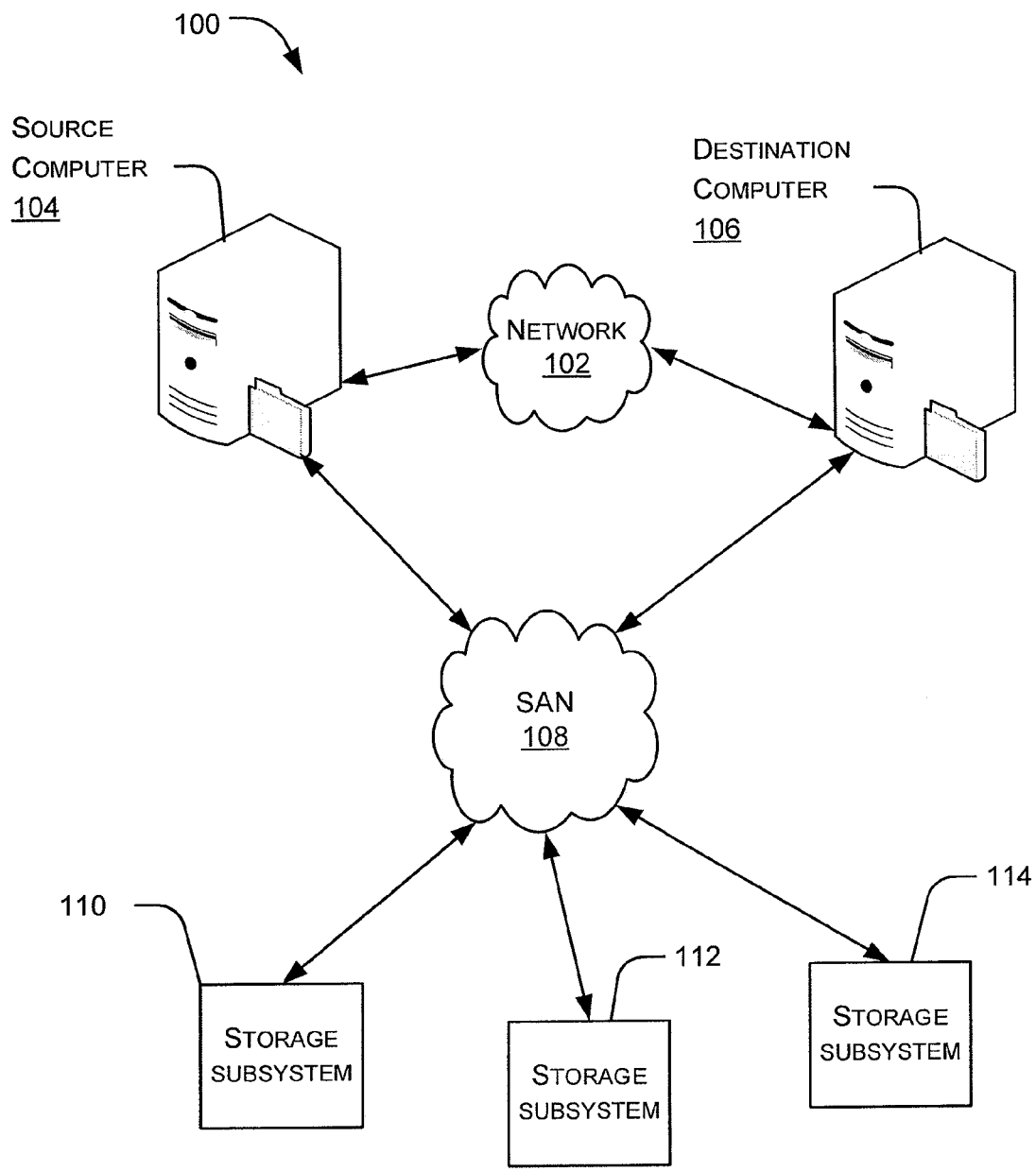
FIG. 1 is a block diagram illustrating an environment in which the subject matter of the disclosure can function, in accordance with particular embodiments of the present disclosure.

FIG. 1 illustrates an exemplary environment 100 in which the subject matter of the disclosure can function. The environment 100 generally includes a network 102 communicatively coupling a source computer 104 to a destination computer 106. The network 102 generally refers to any interconnecting system capable of transmitting audio, video, data, or any combination of signals. Furthermore, the network 102 may include all, or a portion of, a public switched telephone network (PSTN), a public or private network, a local area network (LAN), or other suitable communication network.

The source computer 104 and the destination computer 106 are typically servers but may also include any suitable computer device. Furthermore, the source computer 104 and the destination computer 106 may use any conventional operating system, such as MSWindows®, UNIX/Linux®, or any other appropriate operating system currently available or developed in the future.

The environment may also include a storage area network (SAN) 108, networked with the source computer 104 and destination computer 106. SANs increase storage capacity utilization by attaching remote storage devices to servers in such a way that the devices appear as locally attached to the operating system. The SAN model places storage on its own dedicated network, which generally uses fiber channel technology. The SAN includes one or more hosts that interface with a local area network (LAN), SAN hubs, and other devices to accommodate a large number of storage devices. The hardware that connects workstations and servers to storage devices in a SAN is referred to as a "SAN fabric," where the hardware includes fabric switches, hubs, and similar equipment. The SAN model is often used to perform a LAN-free and server-free tape backup, storage leasing, and similar tasks.

The SAN 108 includes one or more storage sub-systems, such as storage sub-systems 110, 112 and 114, which may include magnetic disks, magnetic tapes, optical discs, or a combination such as disk arrays, tape libraries, and optical jukeboxes. Furthermore, fiber channel connections may be used to connect the SAN 108 with other devices like the source computer 104, the destination computer 106 and the storage devices.

The source computer 104 includes data containers, which are backed up to the destination computer 106. The measures for improving performance of data backups may be performed in the environment 100. These and other embodiments of the disclosure will be described in detail in connection with FIGS. 2-4.

Figure 2:
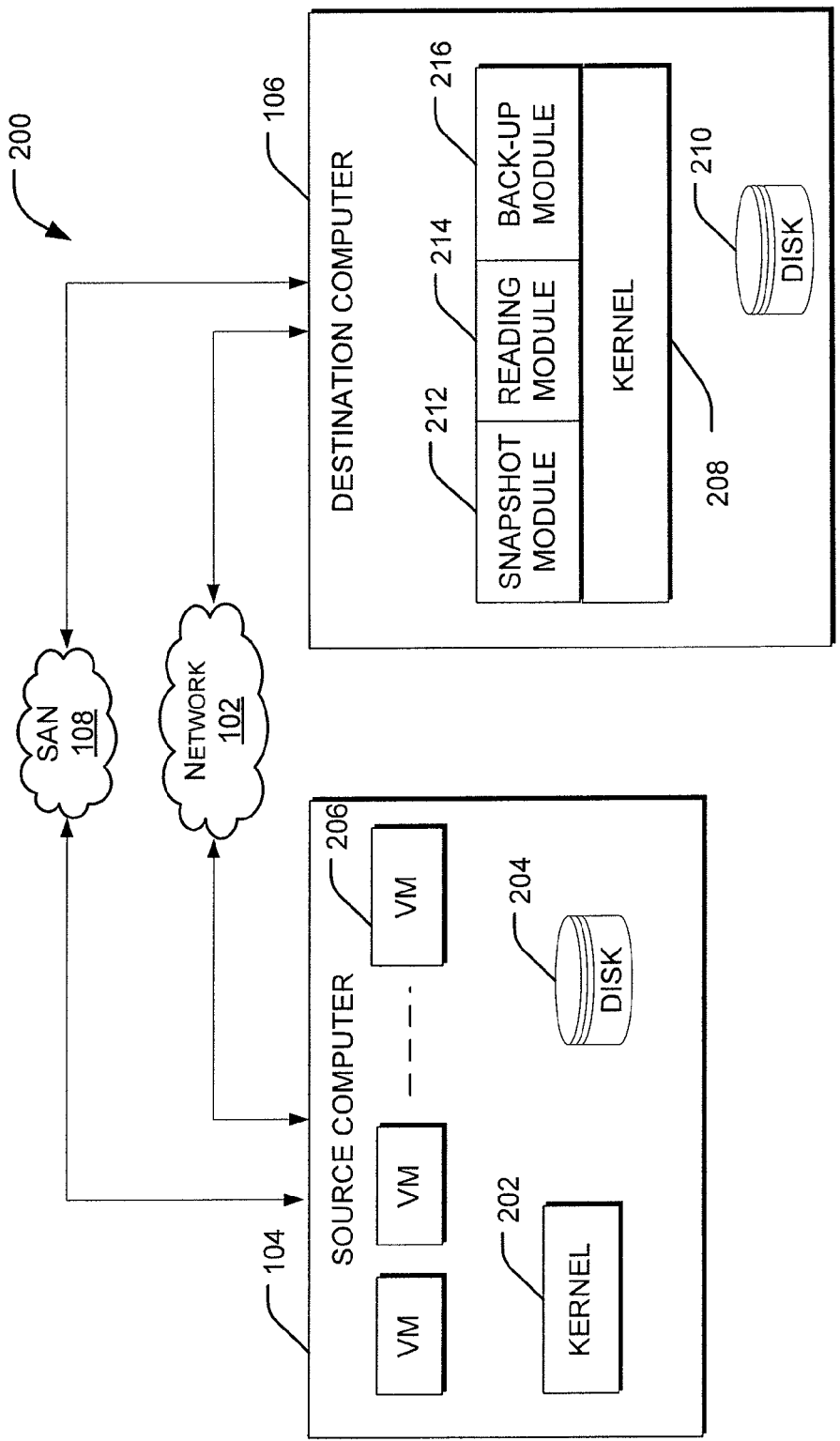
FIG. 2 is a block diagram illustrating a system for improving performance of data container backups in accordance with particular embodiments of the present disclosure.

FIG. 2 is a block diagram illustrating an exemplary system 200 for improving performance of data container backups between the source computer 104 and the destination computer 106. The source computer 104 includes a kernel 202, a disk file repository 204, and a group of virtual machines 206 that run on the kernel 202. The source computer 104 utilizes a virtualization technology capable of capturing "snapshot" images of virtual machines and accessing those images through an interface. A snapshot image is primarily a point-in-time copy of the data container, including one or more logical partitions, that may provide an excellent means of data protection. This virtualization technology may comprise VMware ESX™, Microsoft HYPER-V™, or any similar product capable of performing these functions. For VMware®, such an interface is provided by VCB, vSphere web services SDK, and Virtual Disk Development Kit® (VDDK) API. VCB or vSphere web services SDK may be used to initiate the snapshot of virtual machines. The VDDK is a collection of C libraries, code samples, utilities, and documentation to generate or access VMware® virtual disk storage. The VDDK API may be used to read the snapshot image to a remote location such as the destination computer 106.

The destination computer 106 includes a kernel 208 and a disk file repository 210. Generally, a kernel, such as the source computer kernel 202 or the destination computer kernel 208, controls process, memory, and device management. For process management, the kernel executes multiple applications or processes simultaneously using one or more processors, while for memory management the kernel provides full machine or server memory access to processes, allowing the processes to access this memory safely, as and when required. For device management, the kernel controls peripherals through device drivers, which in turn regulate peripheral access. As device management is very specific to each particular Operating System (OS), device drivers are handled differently by each kernel design, as is understood in the art.

Disk file repositories, such as the source computer disk repository 204 or destination computer disk repository 210, facilitate storage of disk files of various servers. Disk file systems are designed to store files on a data storage device, most commonly a disk drive, which may be directly or indirectly connected to the computer. Disk file systems are generally either journal file systems or versioning file systems. Journal file systems may log changes to a journal before committing them to the main file system, while versioning file systems allow a computer file to simultaneously exist in several versions.

In the destination computer 106, a number of modules, such as a snapshot module 212, a reading module 214, and a backup module 216, run on top of the kernel 208. If the source computer data container is a virtual machine among the group of virtual machines 206, the snapshot module 212 may generate a snapshot image of that virtual machine. If, on the other hand, the data container is a storage object, such as those provided by various cloud computing vendors, a snapshot image may not be generated. If it is generated, the snapshot image may be stored in the source computer disk repository 204, or it may be stored at a remote physical site, or on the network 102.

A snapshot image is primarily a point-in-time copy of the data container, including one or more logical partitions. Snapshot images provide an excellent means of data protection. Data container vendors provide a number of techniques for creating snapshots, and the snapshot module 212 can be configured to employ appropriate techniques, as is known to those in the art. One technique employs vSphere web services SDK to generate snapshots of VMs offered commercially by VMware.

The snapshot module 212 may run on top of the kernel 202, as shown in FIG. 2, or components of the snapshot module 212 may be distributed across the source computer 104 and one or more destination computers in the network 102. The snapshot module 212 is explained in more detail in connection with FIG. 3, below.

The reading module 214 reads data simultaneously from the partitions of the snapshot image or the data container (depending upon which is being backed up, as explained above) using multiple threads on one or more transport paths. The reading module 214 may establish multiple connections for a single partition using the multiple threads, with each connection configured to read data at a different offset of the partition. The backup module 216 proceeds to backup the data read by the reading module 214. As with the reading module 214, components of the backup module 216 may be distributed across destination computers in the network 102. Operating details of the reading module 214 and the backup module 216 are discussed in greater detail in connection with FIG. 3, below.

Figure 3:
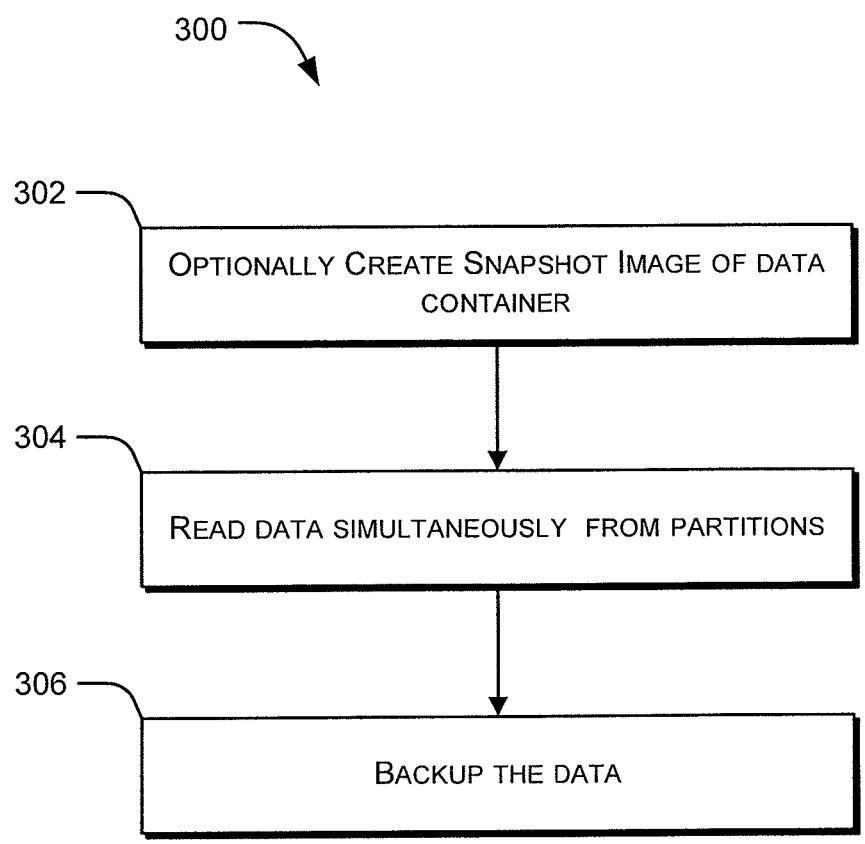
FIG. 3 is a flow chart illustrating a method for improving performance of data container backups in accordance with particular embodiments of the present disclosure.

FIG. 3 illustrates an embodiment of a method 300 for improving performance of data container backups. If the data container to be backed up is a virtual machine in the group of virtual machines 206 (FIG. 2), then at step 302, the snapshot module 212 generates a snapshot image of that data container. If, however, the data container to be backed up is a storage object provided by cloud computing vendors, then the snapshot module 212 may not generate such a snapshot image, but rather the backup process will directly involve the data container. If a snapshot image is generated, then that image includes one or more logical partitions. According to particular embodiments where the data container is a Virtual Machine on a VMware ESX Server or a VMware vSphere Server, a partition may refer to Virtual Machine Disk Format (VMDK) files. The use of VMDK files is explained in further detail in conjunction with FIG. 4 below.

The method 300 continues to step 304, where the reading module 214 reads data simultaneously from the partitions of either the snapshot image or the data container. This reading operation employs multiple threads, over one or more transport paths, to the destination computer 106. The transport paths may be physical or logical paths. A physical path, for example, could extend from the source computer 104 to the destination computer 106, passing through either the network 102 or SAN 108. A logical path is defined purely by logical definitions in the system. As understood by those in the art, a single physical path may be identical to several paths defined in logical terms. In either event, available transport paths may be identified before beginning the read process.

The reading module 214 may employ a vendor-specific interface to read the data to the destination computer 106. For example, in particular embodiments, if the virtual machine is running in a VMware® virtual infrastructure, the VDDK API is used to locate available transport paths and then read the logical partitions (the VMDK files) of the snapshot image. Systems from other vendors would employ appropriate reading modules.

Using the identified transport paths, the reading module 214 establishes connections to the partitions of either the snapshot image or the data container, and the reading module 214 reads data concurrently on those connections. If the number of partitions to be backed up is greater than the available transport paths, then the reading module 214 further determines whether more than one partition can be backed up on a single transport path without affecting net throughput.

According to particular embodiments, the reading module 214 may further determine the number of partitions, and it may then identify available transport paths. The reading module 214 may establish connections over multiple threads, depending on the number and bandwidth of available paths. The reading module 214 may then utilize those paths to transfer data from the source computer 104 to destination computer 106 in the shortest possible time. In other embodiments, the reading module 214 may also establish connections with and read data to several destination computers simultaneously.

Reading module 214 can also establish multiple connections for each partition using multiple threads. Additionally, multiple connections may be established on a single transport path, using different offsets. Each connection is configured to read a different segment of the partition, and the reading module 214 then reads data concurrently using the different connections.

Alternatively, the reading module 214 may use a pre-configured number of threads to read the data. For example, data read by the reading module 214 may be stored in a buffer queue, and the number of threads used by the reading module 214 may be configured as a fixed proportion of the number of buffers in the buffer queue. According to particular embodiments, the number of threads used by the reading module 214 may be set at half the total number of buffers in the buffer queue. According to alternative embodiments, the reading module 214 may also dynamically select the number of threads to read the data. For example, the number of threads may be equal to the number of transport paths available.

Using whichever of the specific methods noted above is configured, the reading module 214 provides data to the backup module 216 in the physical block sequence, as explained in connection with FIG. 4, below. After the data is read, the connections are closed and the backup module 216 backs up the data at step 306.

Figure 4:
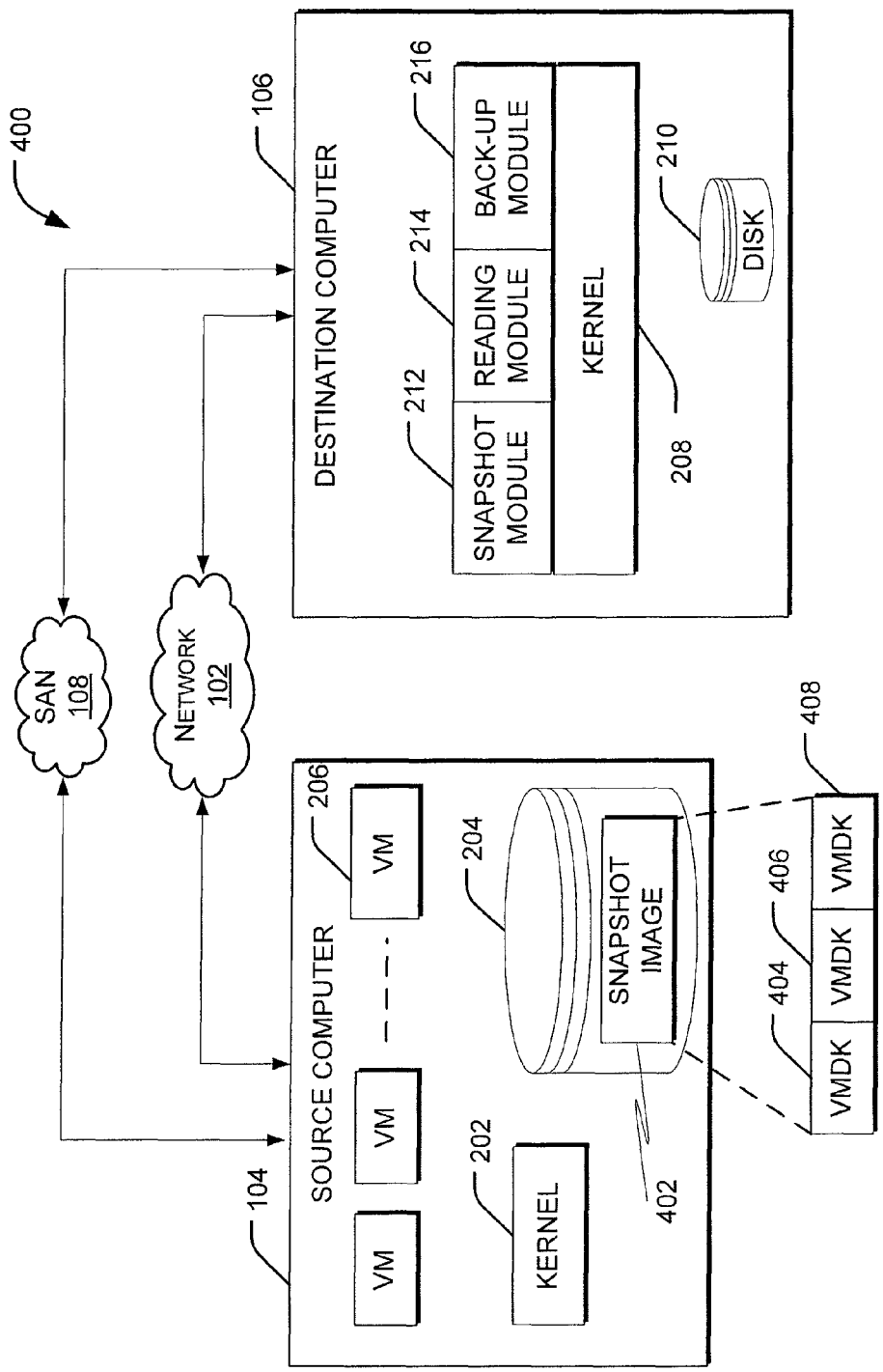
FIG. 4 is a block diagram illustrating a system for improving performance of data container backups in accordance with particular embodiments of the present disclosure.

FIG. 4 depicts a system configured for improved performance of data container backups. Here, the snapshot module 212 generates a snapshot 402 of one of the VM's 206, stored in the disk repository 204. According to the illustrated embodiment, the snapshot image 402 includes three logical partitions, structured as virtual machine disks, VMDK 404, 406, and 408. The reading module then proceeds to read data from the three VMDK's, generally as described above. The reading module 214 could begin by determining the number of partitions and the number of available transport paths. In the illustrated example, three partitions exist (the three VMDK's 404, 406, and 408) and two transport paths are available—one through network 102 and another through SAN 108. The reading module 214 uses multiple threads to establish connections with the three VMDK's 404, 406, and 408 to transfer data to destination computer 106 in the shortest possible time. Assuming, for example, that the available bandwidth for the physical path through SAN 108 is greater than the bandwidth on path running through the network 102, the reading module 214 could initiate a read operation of the VMDK 404 through the network 102 while simultaneously reading the VMDK 406 and the VMDK 408 through the SAN 108. In alternative embodiments, different arrangements may be used.

Figure 5:
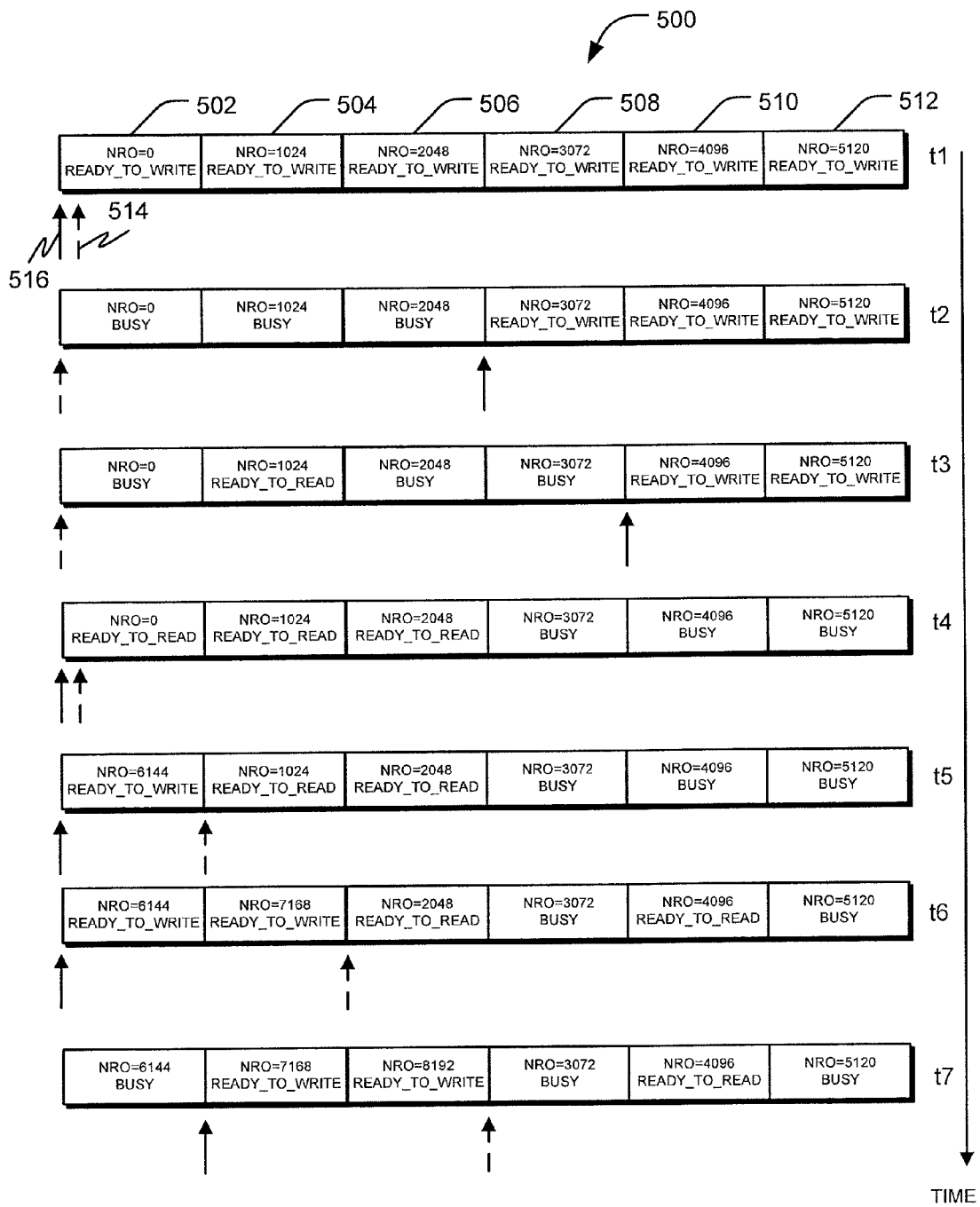
FIG. 5 is a block diagram illustrating an example of the subject matter of the present disclosure in operation in accordance with particular embodiments of the present disclosure.

FIG. 5 illustrates the detailed operation of a method set out in the present disclosure for improving performance of data container backups. The method is illustrated by focusing on a buffer queue 500, used for sharing data between the reading module 214 and backup module 216. The illustrated embodiment employs six buffers 502-512, each having a capacity of 1 KB. It will be understood that the buffer structure and the like are purely exemplary, and actual examples may differ considerably. The buffer queue 500 is shown at seven points in time, t1-t7.

Generally, the reading module 214 reads data from a partition of the snapshot image (or data container) into one of the buffers of buffer queue 500. The reading operation is accomplished by threads referred to as "producer threads." The number of producer threads may be dynamically determined at runtime, based on factors such as system latency and similar issues understood by those in the art. Backup module 216 obtains data from the buffer queue 500 and executes the backup process, employing threads referred to as "consumer threads." In the illustrated embodiment, only a single consumer thread is used for the backup process. However, according to alternative embodiments, multiple consumer threads may be utilized in the backup process.

According to the illustrated embodiment, two pointers are associated with buffer queue 500. A queue read pointer 514 (represented by the dotted arrow) indicates the next buffer from which data may be read by the consumer thread. A queue write pointer 516 (represented by the solid arrow) indicates the next buffer where the producer threads may write data. Furthermore, each buffer in the buffer queue 500 has an associated parameter NEXT_READ_OFFSET (NRO), which indicates the partition offset position from where the producer threads may read data into the buffer. The status of each buffer, READY_TO_WRITE, READY_TO_READ, or BUSY, is also indicated.

At time t1, all six buffers are in READY_TO_WRITE status, which means they are prepared to receive data. The NRO's are sequentially arranged across the six buffers, starting with NRO=0 in buffer 502 to NRO=5120 for buffer 512, respectively. Both queue read pointer 514 and queue write pointer 516 point to the first buffer 502 at this point.

At time t2, the reading module 214 starts reading data from the snapshot image partition. The three producer threads pick up the first free buffers 502-506, after which the write pointer 516 points to buffer 508, and the status of buffers 502-506 is updated to BUSY. Each producer thread reads the NRO value from the assigned buffer and proceeds to read data from the corresponding partition via a vendor-specific interface. For example, when the VMware® infrastructure is being used, the VMware® VDDK API's are used to read data from the VMDK files into the assigned buffer. In alternative embodiments, different architectures may be used.

The read operations for the producer threads may complete in any order, depending on thread scheduling and network latency. At time t3, data has been read into buffer 504, and the status of buffer 504 has been updated to READY_TO_READ, indicating that data in buffer 504 can now be read by the consumer thread, while buffers 502 and 506 are still BUSY. In addition, a producer thread picks up buffer 508, changing its status to BUSY, and the queue write pointer 516 now points to buffer 510, the next free buffer in the sequence.

It should be noted that although buffer 504 is prepared to be read, the queue read pointer 514 points to buffer 502, and hence the consumer thread must wait until buffer 502 is ready to be read, ensuring that data is read by the consumer thread in the physical snapshot image block sequence.

At time t4, data is read into buffers 502 and 506. In addition, the producer threads start reading data into buffers 510 and 512, and the write pointer points to buffer 502.

Then, at time t5, the consumer thread obtains data from buffer 502, pointed to by the queue read pointer 514, and the data is backed up. In addition, the queue read pointer 514 is incremented to point to buffer 504 and the NRO of buffer 502 is updated using Equation 1 given below.

$$\text{Updated NRO} = \text{NRO} + (\text{Number of Buffers} \ast \text{Buffer Size}) \quad (1)$$

The consumer thread updates the NRO of buffer 502 using Equation 1. Here, the value of NRO in buffer 502 is 0. The total number of buffers in the buffer queue 500 is 6, and the buffer size is 1024 bytes. Equation 1 yields the updated NRO for buffer 502 as follows:

$$\text{Updated NRO} = 0 + (6 \ast 1024) = 0 + 6144 = 6144$$

At time t6, the consumer thread completes the data read from buffer 504, and the data is backed up. Thereafter, the queue read pointer 514 is incremented to point to buffer 506, and the NRO of buffer 504 is updated using Equation 1. As shown, the value of NRO in buffer 504 is 1024. The total number of buffers in the buffer queue 500 is 6, and the buffer size is 1024 bytes. Equation 1 provides the updated NRO for buffer 504 below:

$$\text{Updated NRO} = 1024 + (6 \ast 1024) = 1024 + 6144 = 7168$$

Furthermore, at time t6, the producer thread completes writing data into buffer 510 and updates the status of buffer 510 to READY_TO_READ.

Thereafter, at time t7, the data in buffer 506 is read by the consumer thread, and the data is backed up. Subsequently, the queue read pointer 514 is incremented to point to buffer 508, and the NRO of buffer 506 is updated using Equation 1. Here, the value of NRO in buffer 506 is 2048, the total number of buffers in the buffer queue 500 is 6, and the buffer size is 1024 bytes. Equation 1 yields the updated NRO for buffer 506 below:

$$\text{Updated NRO} = 2048 + (6 \ast 1024) = 1024 + 6144 = 8192$$

In an embodiment of the present disclosure, a logic is operable when executed by the destination computer 106 to identify a data container on a source computer to be backed up and generate a snapshot image of a data container from the source computer 104, in which the data container is a virtual machine. Furthermore, the logic is operable when executed by the destination computer 106 to read data simultaneously from partitions of the snapshot image and the data container from the source computer 104 to the destination computer 106 using multiple threads. The data is read from the partitions of the data container when the data container is a storage object other than a virtual machine. Available transport paths are used to read the data to the destination computer 106. The logic is encoded in a tangible computer readable media. Furthermore, the logic is operable to access the data simultaneously from different offsets in a partition using multiple threads. The logic then provides the data for backup in the physical block sequence. Moreover, the logic is operable when executed with VMware® API deployed on the destination computer, where VMware® ESX™ is the source computer.

Systems and methods disclosed herein may be implemented in digital electronic circuitry, in computer hardware, firmware, software, or in combinations of those devices.

Although a number of specific, commercially-available products have been noted, those in the art will understand that the subject matter of this disclosure can be implemented in a wide variety of embodiments and environments, including those currently in existence as well as any developed in the future.

The specification has described a system suitable for secure data transfer applications. The specification has also set out a number of exemplary embodiments, but persons of skill in the art will understand that a myriad of variations in these embodiments will naturally occur in the course of embodying the subject matter of the disclosure in specific implementations and environments. It will further be understood that such variations, and others as well, fall within the scope of the disclosure. Neither those variations nor the specific examples set above shall be construed to limit the scope of the disclosure.

What is claimed is:

1. A method for improving performance of data container backups, the method comprising the steps of:
    identifying a data container on a source computer to be backed up;
    generating a snapshot image of the data container, wherein the snapshot image comprises multiple partitions;
    reading data simultaneously from the multiple partitions to a destination computer over one or more transport paths, wherein each of the one or more transport paths comprises one or more threads; and
    backing up the data read to the destination computer, such that the data retains a physical block sequence of the data container.

2. The method of claim 1, wherein the data container comprises a virtual machine and the partitions of the snapshot image comprise virtual machine disks.

3. The method of claim 2, wherein the source computer employs virtualization technology that allows creating and accessing the snapshot image of the virtual machine through an interface.

4. The method of claim 2, wherein generating a snapshot image generates the snapshot image of a virtual machine; and wherein reading the data uses a vendor specific interface to read the data.

5. The method of claim 1, wherein the one or more transport paths comprise one or more Ethernet connections and fibre channel Logical Unit Numbers (LUNs).

6. The method of claim 1, wherein reading data further comprises determining available transport paths for obtaining the data.

7. The method of claim 6, wherein one or more of the available transport paths are used to obtain the data from each partition.

8. The method of claim 6, wherein the transport paths are chosen in an optimal way based on available bandwidth of each transport path.

9. The method of claim 1, wherein the reading step further comprises accessing the data simultaneously from different offsets in a partition using the one or more threads.

10. The method of claim 1, wherein the reading step comprises using one of a pre-configured number of threads or dynamically selected number of threads to read the data.

11. The method of claim 1, wherein the destination computer is a server located remotely to the source computer.

12. A system for improving performance of data container backups, the system comprising:
    a processor-controlled server, the server comprising:
        a memory;
        a snapshot module being operable to:
            identify a data container on a source computer to be backed up;
            generate a snapshot image of the data container, wherein the snapshot image comprises multiple partitions;
        a reading module being operable to read data simultaneously from the multiple partitions to a destination computer over one or more transport paths, wherein each of the one or more transport paths comprises one or more threads; and
        a backup module being operable to back up the data read to the destination computer, such that the data retains a physical block sequence of the data container.

13. The system of claim 12, wherein the data container comprises a virtual machine and the partitions of the snapshot image comprise virtual machine disks.

14. The system of claim 12, wherein the reading module is further configured to access the data simultaneously from different offsets in a partition using the multiple threads.

15. The system of claim 12, wherein the reading module is further operable to determine available transport paths for obtaining the data.

16. The system of claim 15, wherein one or more of the available transport paths are used to obtain the data from each partition.

17. The system of claim 15, wherein the transport paths are chosen in an optimal way based on available bandwidth of each transport path.

18. Logic encoded in a tangible computer readable media, the logic operable when executed by a computer to:
    identify a data container on a source computer to be backed up;
    generate a snapshot image of the data container, wherein the snapshot image comprises multiple partitions;
    read data simultaneously from the multiple partitions to a destination computer over one or more transport paths, wherein each of the one or more transport paths comprises one or more threads; and
    back up the data read to the destination computer, such that the data retains a physical block sequence of the data container.

19. The logic of claim 18, wherein the logic is further operable to determine available transport paths for obtaining the data.

20. The logic of claim 19, wherein the transport paths are chosen in an optimal way based on available bandwidth of each transport path.

* * * * *